Feb. 14, 1933.  W. V. D. KELLEY  1,897,846

FILM, PLATE, AND THE LIKE

Filed April 8, 1930

Inventor,
William V. D. Kelley;
By Calvin Brown
Attorney.

Patented Feb. 14, 1933

1,897,846

UNITED STATES PATENT OFFICE

WILLIAM V. D. KELLEY, OF LOS ANGELES, CALIFORNIA, ASSIGNOR TO DU CHROME FILM SYSTEM LTD., OF LOS ANGELES, CALIFORNIA, A CORPORATION OF CALIFORNIA

FILM, PLATE, AND THE LIKE

Application filed April 8, 1930. Serial No. 442,557.

This invention relates to film, plates and the like for photographic use.

More particularly, the invention contemplates an article of manufacture embodying in its construction a base, upon one side or both sides of which are two or more separated emulsions and which emulsions are so related that one of said emulsions may be photographically affected without affecting the other emulsion, all in accordance with the desire of the photographer.

As an example, I may provide a flexible film of the character used for moving picture work, consisting of the usual celluloid base, one side of which is tinted with a color, for instance, blue or lavendar, and the other side of which may carry two or more emulsions. By way of example, I may provide a double emulsion separated by a coating of dye in gelatin. In another embodiment of the invention, I may provide a celluloid base, a side of which is colored, or the celluloid itself is colored, and upon which is carried two or more emulsions separated in each instance as to pairs by a color. The invention is capable of performing and affording unusual photographic results. If trick photography is desired, it is possible to photograph a subject into one emulsion and photograph any other subject into the other emulsion. The present article of manufacture acts as a positive film, although within the scope of the invention and certain adaptations thereof, as will readily suggest themselves to any one skilled in the art, such a film could be used as a negative. The film or plate is ideal for use in color photography, in that the coating of dye in gelatin interposed between each pair of photo-sensitive emulsions is adapted to stop out certain rays of light and the other color, which may be carried upon the base, is adapted to stop other colors. In the example above given, the coating of dye in gelatin may be orange. Thus, spectrum colors of certain values will be allowed to impress values in one of the photo-sensitive emulsions, the other colors being stopped. The blue color, if blue is used, will permit other spectrum values to affect the other emulsion, with the result that all spectrum colors or substantially all, are present photographically speaking in both emulsions. Furthermore, it is intended that the coating of dye in gelatin and the coating of color on the celluloid base should be such that when viewed together a substantially neutral color effect is obtained. In other words, the colors present when combined are optically negligible. Hence, I may use various colors for the purpose intended, as long as the result or object set forth is kept in mind. In actual practice, the two colors remain on the film and are not removed or altered in the baths usually used.

By way of explanation, it may be said that in using this particular film for color photography purposes, a positive along with the negatives may be run through and printed in the usual manner. One photo-sensitive emulsion may be readily affected by a chemical tone, and the other emulsion by a dye; the result will be that two colors are produced on two emulsions on the same side of a base.

In certain embodiments of the invention, it may be desirable to employ, so far as the negative film is concerned, an emulsion that is specially sensitive to red light and an emulsion that is specially sensitive to blue-green light. Also the two emulsions may be of different speeds so that if exposed from one side, the back emulsion furthest from the objective will produce an image corresponding in density to the emulsion nearest to the light. This, of course, is a requisite for negatives. For positives, where exposures are made from opposite sides, the two emulsions may be so balanced that the developing solutions which require more time to penetrate the gelatin layer nearest the base, develop in the same time so that the images appearing in both emulsions are alike in density and contrast.

Other objects of the invention will appear as the specification proceeds, and with the object of producing a film which is superior to ordinary film, the invention consists in the novel and useful provision, formation, construction, association and relative arrangement of the several elements constituting the invention, all as shown by way of illustration in the drawing, described generally, and more particularly pointed out in the claims.

Figure 1:
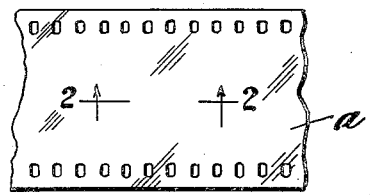
Figure 1 is a fragmentary plan view of a film embodying the invention.
Figure 2:
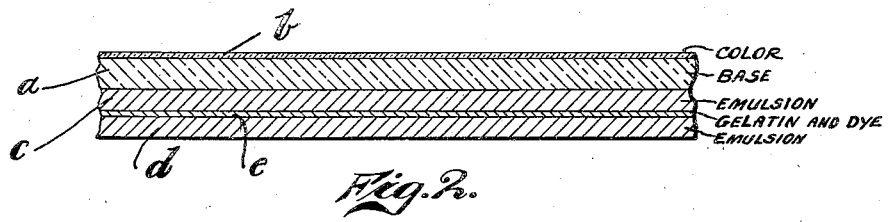
Figure 2 is a sectional view on the line 2—2 of Figure 1, and on an enlarged scale from the showing of Figure 1.
Figure 4:
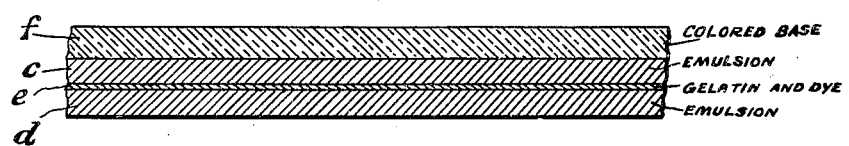
Figure 4 is a modified form of the invention.

Referring to the drawing, I provide a base $a$, and in the case of the invention shown in Figure 2, this base may have on one surface thereof a coating of color $b$. The opposite face of the base is adapted to carry a photo-sensitive emulsion $c$. Another photo-sensitive emulsion $d$ is provided and between the emulsions $c$ and $d$ is a coating of dye in gelatin $e$. This coating of dye in gelatin may be orange in color, and is adapted to act as a light insulator and preferably is not easily removed from the film. In order not to attempt a removal thereof, the coating of color $b$ is of such a nature that when the dye in gelatin $e$ plus the coating or color $b$ are viewed together, such colors neutralize. In other words, the coating $b$ is of a color adapted to neutralize the color of the dye in gelatin $e$. This same procedure would apply in the case of a photographic plate. It is intended that this color $b$ should be insoluble in ordinary liquids, such as water, so that said color will remain upon the base to neutralize the dye strata $e$ in the manner just stated. Thus, the colors utilized for this purpose are complementary or substantially so. While the base may be coated with a color $b$, yet it is within the purview of the invention to allow the base to be itself colored as shown in Figure 4, the colored base being designated as $f$. For instance, I may utilize a blue-lavendar dye in a solvent of celluloid, and thus this color will become an integral part of the base. The coating of dye in gelatin $e$ may be of yellow-orange shade, being a dye dissolved in gelatin and coated over the first emulsion. This dye should have the quality of not bleeding into the gelatin within the time required for it to set and to form a clean cut layer. This layer of gelatin containing the dye also has the important function of giving a body distance between two photographic images that are to appear on the completed film. It acts both as a light filter and a separator for chemical baths. In the two colors used, it is necessary that the stratum color must be of a color complementary to the sensitiveness of the emulsion. If the film is to be printed from both sides, the tint color on the base must be on the blue side to which the film is sensitive so that in the first instance, the color is the opposite in color to those colors to which the emulsion is sensitive, while the color on the base permits the light to print into the base emulsion. By way of example, the coating of dye in gelatin is one chosen from the family of direct dyes and is preferably of an orange or yellow shade. As stated, neither image, one of which is printed from the base side of the film and the other from the emulsion side, will pass through the stratum $e$. Thus, both layers of gelatin are completely independent and the film may be developed, fixed and dried in the usual manner. The treatment of the film, of course, renders the film transparent or so that light may readily pass therethrough which is, of course, an absolute essential.

As I have before set forth, I may in certain instances, provide emulsions $c$ and $d$ of different characteristics and sensitive to different spectrum values, in place of the emulsions shown which may be sensitive to all spectrum values. I refer to such emulsions as panchromatic and ortho-chromatic.

Figure 3:
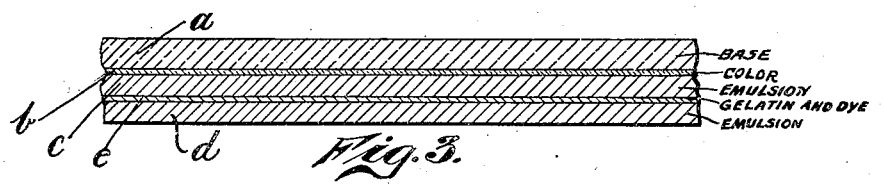
Figure 3 is a modified form of the invention shown in Figure 2.

The form of the invention shown in Figure 3 is not at all different in concept from that shown in Figure 2, save and except that the coating of color $b$ which, as before stated, is of such nature as to become an integral part of the base, has placed thereover the emulsion $c$ with the coating of dye in gelatin $e$ separating the further emulsion $d$ placed thereon. It is quite apparent that the result obtained is the same as before.

This invention differs from my copending application filed in the United States Patent Office April 13, 1929, Serial No. 354,779, in that said invention just referred to provides for a transparent base with two layers of emulsion separated by a layer of gelatin containing a coloring matter, which coloring matter may afterward be eliminated by any suitable bleaching chemical. This invention differs from the invention aforesaid in that the colors are adapted to remain in the film and have such characteristics that when combined or viewed together they are optically negligible.

It is obvious that various changes and modifications and variations may be made in practicing the invention in departure from the particular showing and description as given without departing from the true spirit of the invention.

I claim:

1. As a new article of manufacture, a photographic film or plate having a base, a pre-selected color therefor, a plurality of photo-sensitive emulsions carried by the base, and a separator having a color complementary to the pre-selected color interposed between contiguous emulsions.

2. As a new article of manufacture, a photographic film or plate including a colored transparent base, a pair of photo-sensitized emulsions carried by said base, and a layer of gelatin containing a permanent dye between said emulsions having a color substantially complementary to the base color.

3. As a new article of manufacture, a photographic film or plate including a transparent base having a substantially blue color, a pair of photographic emulsions carried by the base, and a layer of substantially complementary color interposed between said emulsions.

4. As a new article of manufacture, a photographic film or plate including a substantially transparent base having a spectrum color on the blue side, a pair of photo-sensitive emulsions carried by said base, and a dyed gelatin layer interposed between said emulsions having a spectrum color substantially opposite to the spectrum color of the base.

In testimony whereof, I have signed my name to this specification at Los Angeles, California, this 31st day of March, 1930.

WILLIAM V. D. KELLEY.